United States Patent

Nakayabu

[11] Patent Number: 5,926,211
[45] Date of Patent: Jul. 20, 1999

[54] METHOD OF MEASURING FOCUS OF CATHODE RAY TUBE

[75] Inventor: Tomoyasu Nakayabu, Aichi, Japan

[73] Assignee: Sony Corporation, Tokyo, Japan

[21] Appl. No.: 08/823,164

[22] Filed: Mar. 25, 1997

[30]    Foreign Application Priority Data

Mar. 27, 1996  [JP]  Japan .................................. 8-072856

[51] Int. Cl.⁶ ............................................... H04N 17/04
[52] U.S. Cl. ..................... 348/190; 348/806; 348/805; 348/180; 348/191
[58] Field of Search ................................. 348/191, 189, 348/190, 180, 185, 178, 806, 807, 805, 177; H04N 17/04, 17/02, 17/00

[56]          References Cited

U.S. PATENT DOCUMENTS

| | | | |
|---|---|---|---|
| 4,593,309 | 6/1986 | Uno et al. ............................... | 348/191 |
| 4,686,429 | 8/1987 | Fendley ................................... | 348/807 |
| 5,049,791 | 9/1991 | Kawakami ............................... | 348/191 |
| 5,440,340 | 8/1995 | Tsurutani et al. ...................... | 348/190 |
| 5,793,340 | 8/1998 | Morita et al. ........................... | 348/806 |
| 5,793,447 | 8/1998 | Fujiwara et al. ........................ | 348/807 |
| 5,796,425 | 8/1998 | Minami et al. .......................... | 348/189 |
| 5,801,767 | 9/1998 | Wu ........................................... | 348/190 |
| 5,825,414 | 10/1998 | Webb et al. ............................ | 348/180 |

*Primary Examiner*—John K. Peng
*Assistant Examiner*—Jean W. Désir
*Attorney, Agent, or Firm*—Jay H. Maioli

[57]                ABSTRACT

In a method of measuring a focus of a cathode ray tube, a predetermined image is displayed at a predetermined position on the screen of the cathode-ray tube. A focussing voltage of the cathode ray tube is changed under a condition that a distance from a reference position to a predetermined position in the image is detected. A change state of the detected distance is displayed on a display. Further, an image having representation of at least a vertical-direction line and a horizontal-direction line is employed as the predetermined image. A line sensor is located so as to cross both of the vertical-direction line and the horizontal-direction line to set a predetermined position of the line sensor as the reference position. A change of a first distance from the reference position to an edge of the vertical-direction line within the image read by the line sensor and a change of a second distance from the reference position to an edge of the horizontal-direction line within the image read by the line sensor are detected. The detected changes of the respective distances are displayed on orthogonal coordinates.

6 Claims, 8 Drawing Sheets

METHOD OF MEASURING FOCUS OF CATHODE RAY TUBE

BACKGROUND OF THE INVENTION

1. Field of the Invention

The present invention relates to a method of measuring a focus suitable for use in an adjustment of a focussing voltage of a television receiver or a monitor using a cathode ray tube.

2. Description of the Related Art

Before a manufactured picture display apparatus using the cathode ray tube is shipped from a factory, it is necessary to adjust it to a proper condition by measuring a focus of its electron beam in order to obtain a satisfactory picture displayed on a screen of the cathode ray tube.

The assignee of this application previously proposed as one of the methods of measuring the focus a method of measuring the focus by displaying a so-called crosshatch image including a vertical line and a horizontal line crossed each other on a screen of a cathode ray tube and then reading the crosshatch image by a CCD line sensor (Japanese patent application No. 304032/1992 etc.). In this method, the focussing voltage is adjusted so that the finest width of the vertical line and the finest width of the horizontal line displayed on the cathode ray tube as the crosshatch image are detected from an output of the CCD line sensor. This adjustment allows the electron beam to be adjusted to in focus state.

However, when the focus is measured in accordance with the measuring method of detecting the widths of the vertical and horizontal lines thus displayed, the in focus state or a proper focus state can be detected, but when it is not an in focus state, it is impossible to determine whether the current adjusted state is an over-focus state (a state at a focussing voltage lower than a correct one) or an under-focus state (a state at a focussing voltage higher than a correct one). Therefore, the adjustment of the focus to the in focus state takes a long time and a high-accuracy focus adjustment is difficult to achieve.

SUMMARY OF THE INVENTION

In view of such problems, it is an object of the present invention to enable the focus adjustment of a picture display apparatus to be accomplished simply and accurately.

According to an aspect of the present invention, in a method of measuring a focus of a cathode ray tube, a predetermined image is displayed at a predetermined position on the screen. A focussing voltage of the cathode ray tube is changed under a condition that a distance from a reference position to the predetermined position in the image is detected. A change state of the detected distance is displayed on a predetermined display means.

DESCRIPTION OF THE PREFERRED EMBODIMENT

A method of measuring the focus of a cathode-ray tube according to an embodiment of the present invention will be described below with reference to the accompanying drawings.

Figure 1:
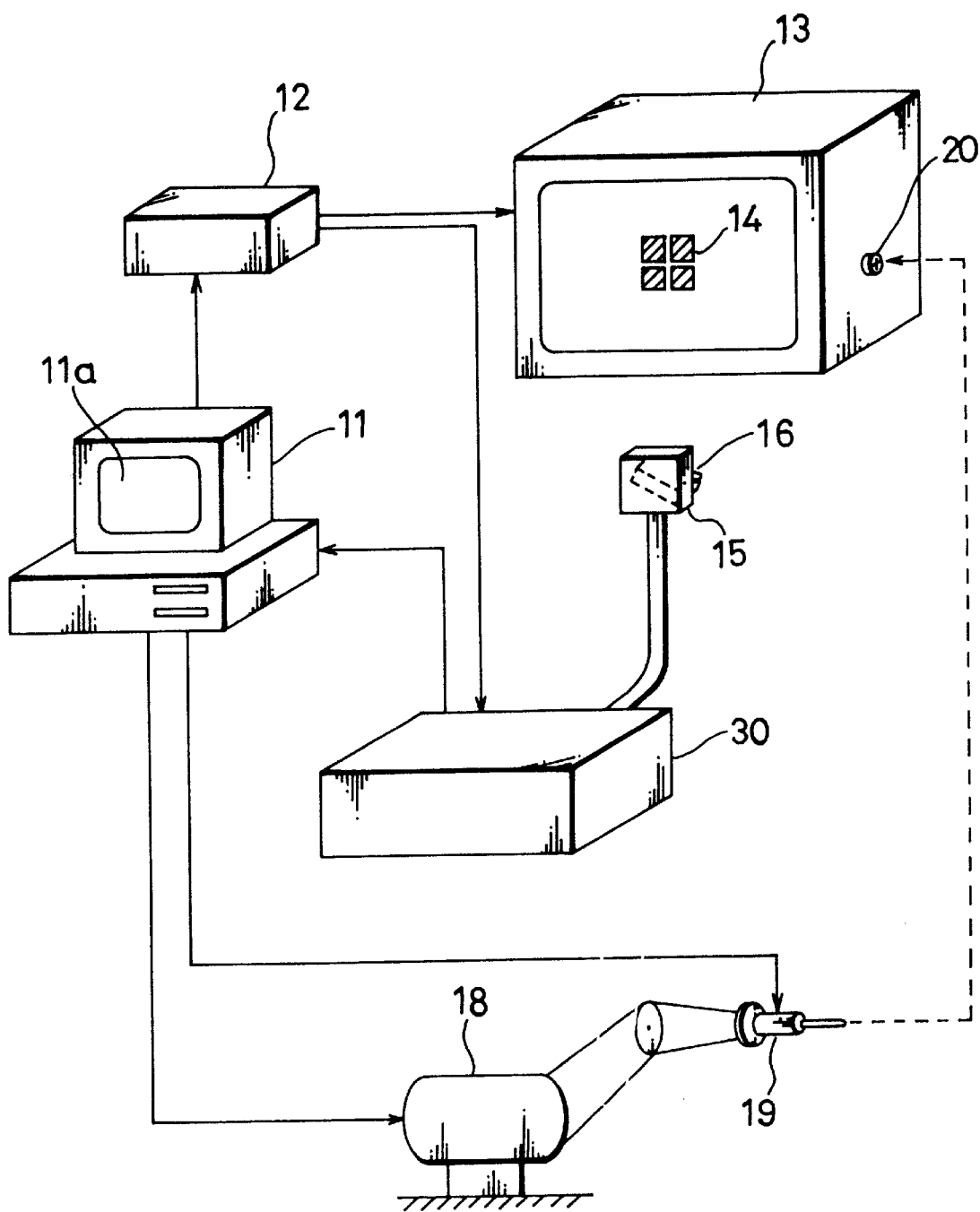
FIG. 1 is a diagram showing an arrangement of a system to which a measuring method according to an embodiment of the present invention is applied.
Figure 3:
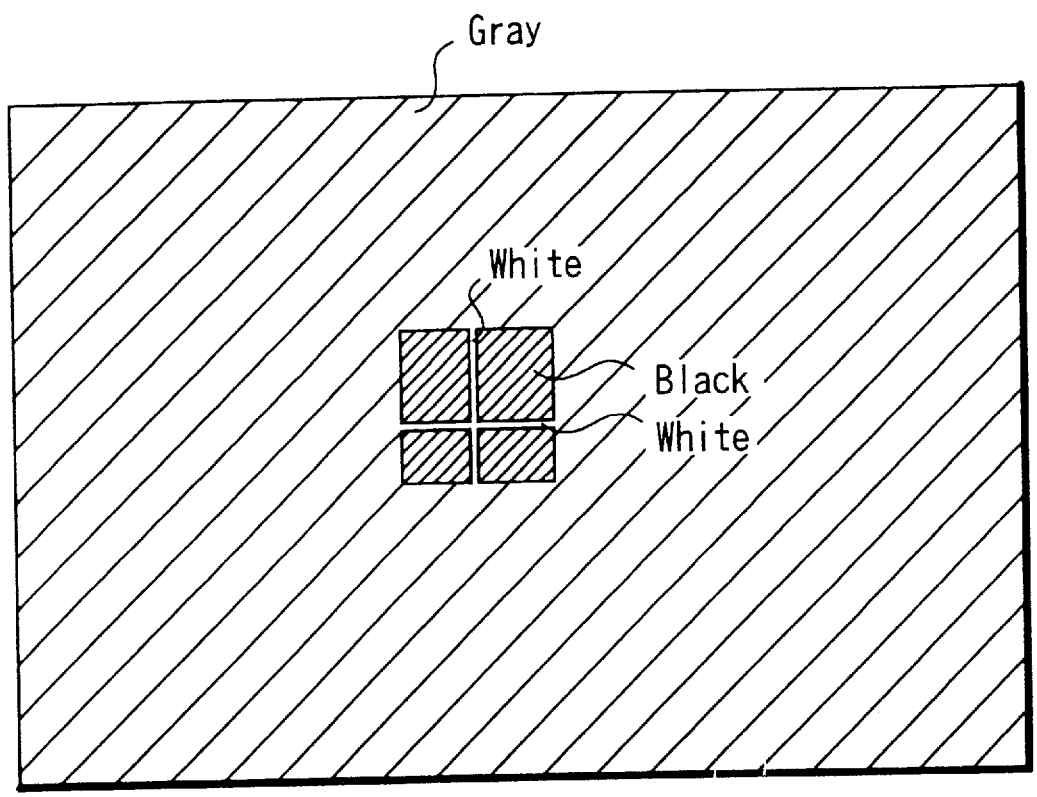
FIG. 3 is a diagram showing a crosshatch image used in the measuring method according to the embodiment.

FIG. 1 is a diagram showing an arrangement of a system to which the measuring method according to this embodiment is applied. A focus measuring processing using the system arrangement shown in FIG. 1 will be described. A focus adjustment in this embodiment is performed by measuring a crosshatch image 14 displayed on a screen of a cathode ray tube of a television receiver 13. Specifically, a measurement control device 11 comprised of a computer device controls a generator 12 for generating a video signal for measurement to generate a crosshatch signal for the focus adjustment that is equivalent to a monoscope signal. The generator 12 supplies the crosshatch signal for the focus adjustment to the television receiver 13 as a video signal to display the crosshatch image 14 on the screen of the television receiver 13. This crosshatch image 14 is formed, for example, as shown in FIG. 3, so as to have a black portion at an area to be detected by a sensor and in the vicinity thereof, vertical and horizontal bright lines having predetermined width and colour crossing each other in the black background portion, and a gray portion at the reset of areas. A brightness level of this gray area is changed to be equivalent to that of a monoscope signal. A luminous colour of the vertical and horizontal bright lines is determined as, for example, white (or the luminous colour of green or the like emitted from a single fluorescent substance).

Figure 2:
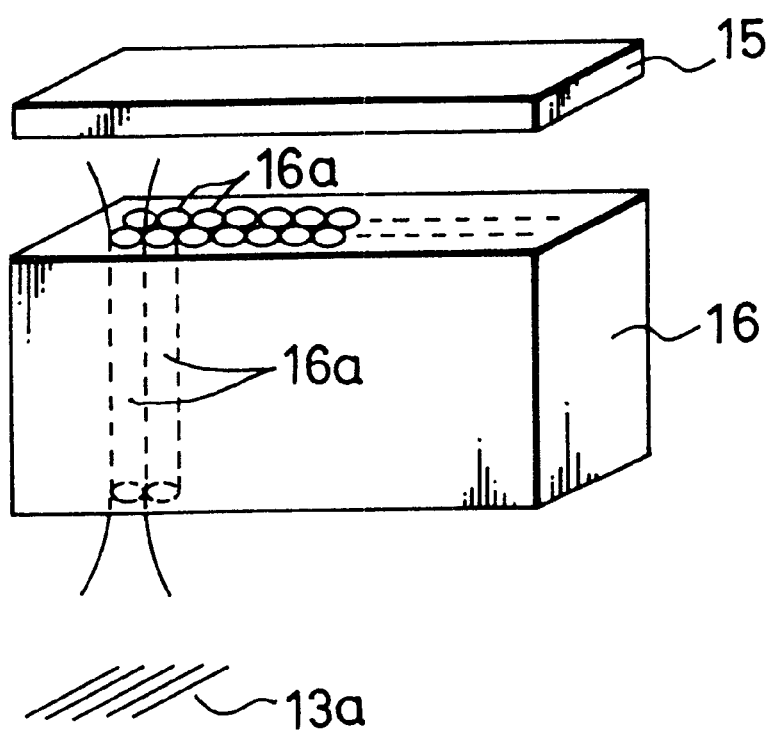
FIG. 2 is a diagram used to explain a measurement of a screen in the system shown in FIG. 1.

In this state, a CCD line sensor 15 having a multi-lens array 16 attached thereto is put closely on the screen of the television receiver 13 to thereby detect the vertical and horizontal lines of the bright lines in the crosshatch image 14 displayed thereon. At this time, focus of each lens forming the multi-lens array 16 is slightly shifted from a surface of the screen of the cathode-ray tube. Specifically, as shown in FIG. 2, the multi-lens array 16 has a plurality of cylindrical micro-lenses 16a linearly arranged and functions as an optical relay member to make light indicative of the image displayed on the screen 13a of the television receiver 13 incident on the CCD line sensor 15. The focus of each micro-lens 16a relative to the screen 13a is adjusted so as to be slightly shifted from the screen.

The CCD line sensor 15 has light detecting portions linearly arranged, reads a signal charge stored in each of the light detecting portions, and supplies the read signal charges to a beam size measuring unit 30 as a detection signal. The beam size measuring unit 30 measures a horizontal-direction width $H_W$ of the vertical bright line and a vertical-direction width $V_W$ of the horizontal bright line based on the detection signals (see FIG. 4). In this measuring processing, the beam size measuring unit 30 compares a sensor output signal supplied from the CCD line sensor 15 thereto with a reference level to measure the widths $H_W$ and $V_W$ based on a width of the signal portion with a level exceeding the reference level.

Figure 4:
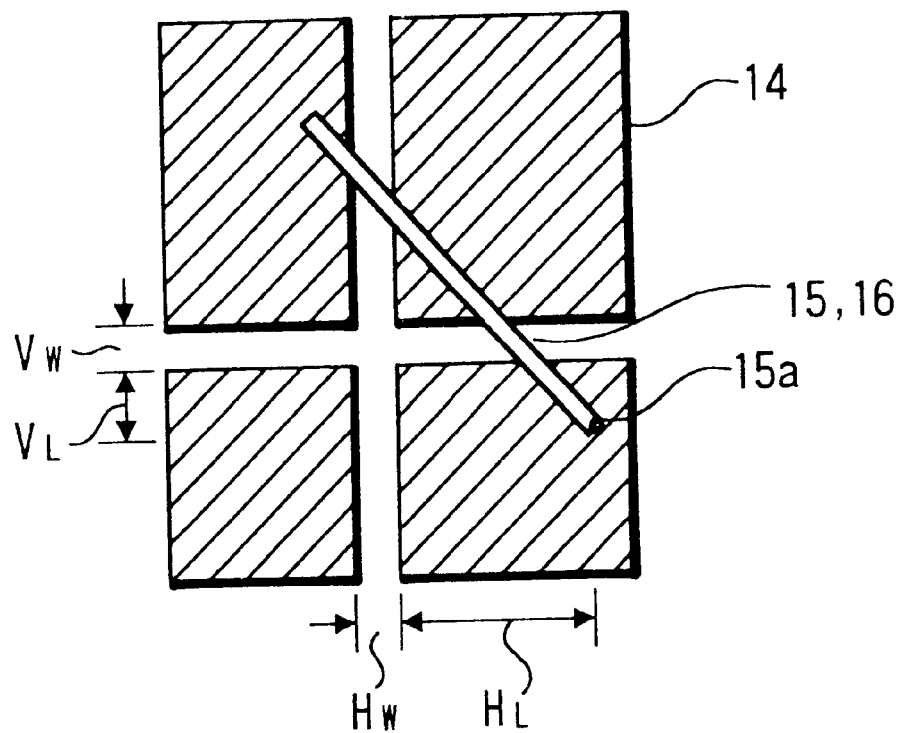
FIG. 4 is a diagram used to explain a state that a sensor is located in the embodiment.

In this embodiment, in addition to these widths $H_W$ and $V_W$, a position $H_L$ from a reference position to an edge of the vertical line and a position $V_L$ from a reference position to an edge of the horizontal line are measured as shown in FIG. 4. On the assumption that positions where detection of the widths $H_W$ and $V_W$ of the vertical line and the horizontal line based on the signal widths is started are determined as the edges of the vertical and horizontal lines, distances from a predetermined position (in this case, one end portion) of the CCD line sensor 15 to the respective edges of the vertical and horizontal lines are determined as the positions $H_L$ and $V_L$.

Specifically, as shown in FIG. 4, the CCD line sensor 15 and the multi-lens array 16 are located diagonally relative to the vertical and horizontal bright lines of the crosshatch image 14 so as to cross over both of the vertical line and the horizontal line. Thus, the widths $H_w$ and $V_w$ and the positions $H_L$ and $V_L$ are measured. In this state, the widths $H_W$ and $V_W$ are detected based on the widths of the signal having a level exceeding the reference level of the output signal of the CCD line sensor 15, and the positions $H_L$ and $V_L$ are detected by detecting the distances from the one end position 15a of the CCD line sensor 15 to the edges of the width $H_W$ and $V_W$.

Figure 5:
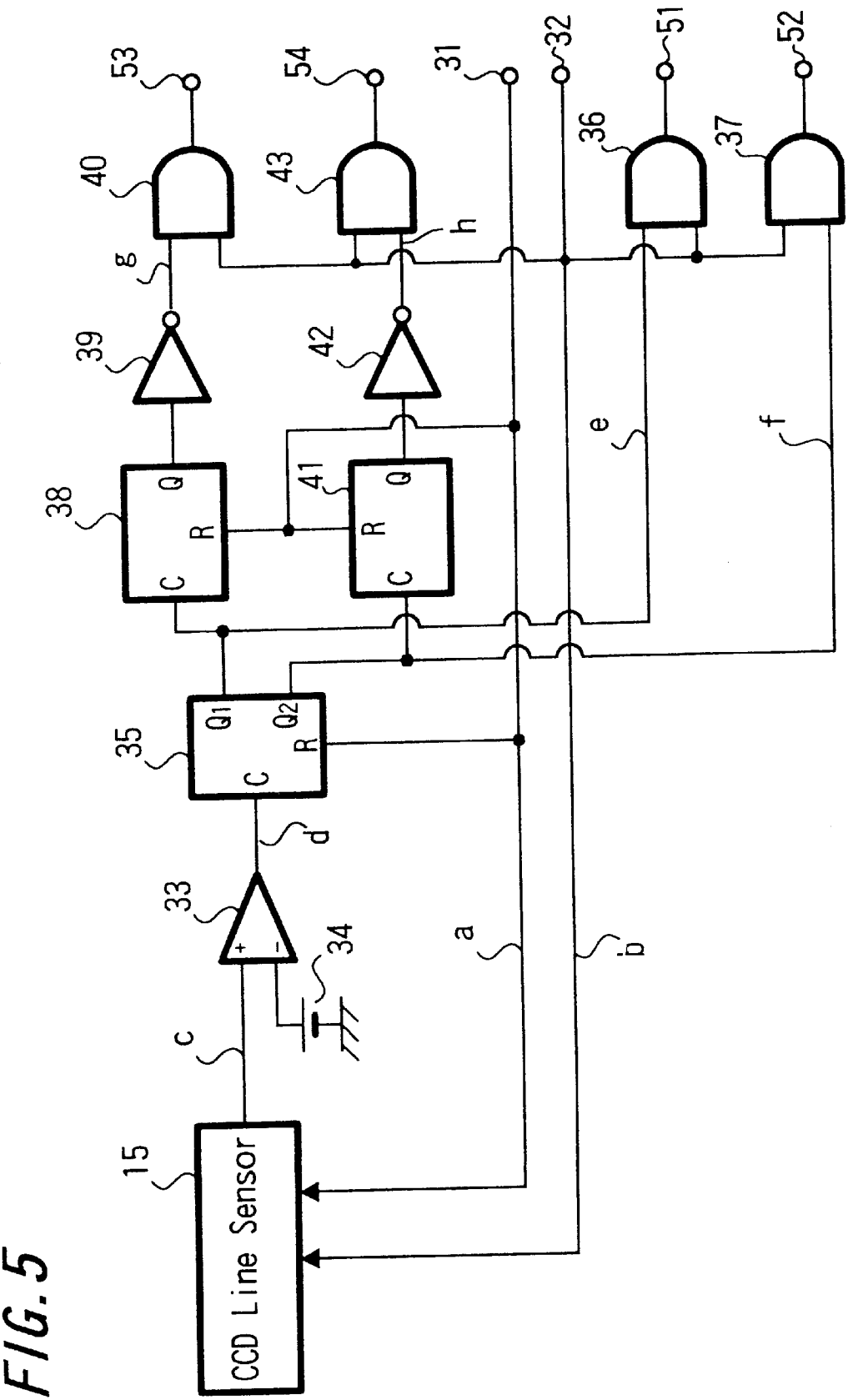
FIG. 5 is a block diagram showing an arrangement of a detecting unit of a beam-size measuring circuit shown in FIG. 1.

An arrangement for detecting the widths $H_W$ and $V_W$ and the positions $H_L$ and $V_L$ in the beam size measuring unit 30 according to this embodiment will be described with reference to FIG. 5 which is a block diagram therefor and FIGS. 6A to 6H which are timing charts for its operation. Signals shown in FIGS. 6A to 6H correspond to signals transmitted through signal lines denoted by reference characters a to h in FIG. 5, respectively.

Initially, the CCD line sensor 15 is supplied with a reading start signal a (shown in FIG. 6A) from a terminal 31 at the side of the measuring unit 30 and at the same time with a transfer clock signal b (shown FIG. 6B) from a terminal 32 at the side of the measuring unit 30. A sensor output a (shown in FIG. 6C) is read out from the CCD line sensor 15 at a speed synchronized with the transfer clock signal b from a timing when the reading start signal a is supplied thereto. The sensor output c is supplied to a positive side input terminal of a comparator 33 of the measuring unit 30. A reference voltage source 34 is connected to a negative (−) side input terminal of the comparator 33. Therefore, the sensor output having a level exceeding a reference level which is a voltage of the reference voltage source 34 is derived from the comparator 33 as a detected output d of the bright lines. Specifically, as shown in FIG. 6D, the comparator 33 outputs the pulse signal d having a high level when the bright lines are detected and a low level when either of the bright lines is not detected.

The comparator 33 supplies its output signal d to a vertical/horizontal-line separator circuit 35. This vertical/horizontal-line separator circuit 35 is supplied at its reset terminal R with the reading start signal a (shown FIG. 6A) as a reset pulse and supplies the first pulse supplied to its pulse input terminal C after receiving the reset pulse to an output terminal $Q_1$, and supplies a pulse subsequently supplied thereto to an output terminal $Q_2$. A signal output e from the output terminal $Q_1$ of the vertical/horizontal-line separator circuit 35 is supplied to one input terminal of an AND gate 36 as a vertical width detection pulse (shown in FIG. 6E). This AND gate 36 is supplied at the other input terminal with the transfer clock signal b from the terminal 32, and the transfer clock signal is output from a terminal 51 connected to the AND gate 36 only during a pulse duration of the vertical width detecting pulse. A counter (not shown) connected to the terminal 51 counts the output clock signal and hence this count value corresponds to the measured vertical width $V_w$.

Figure 6:
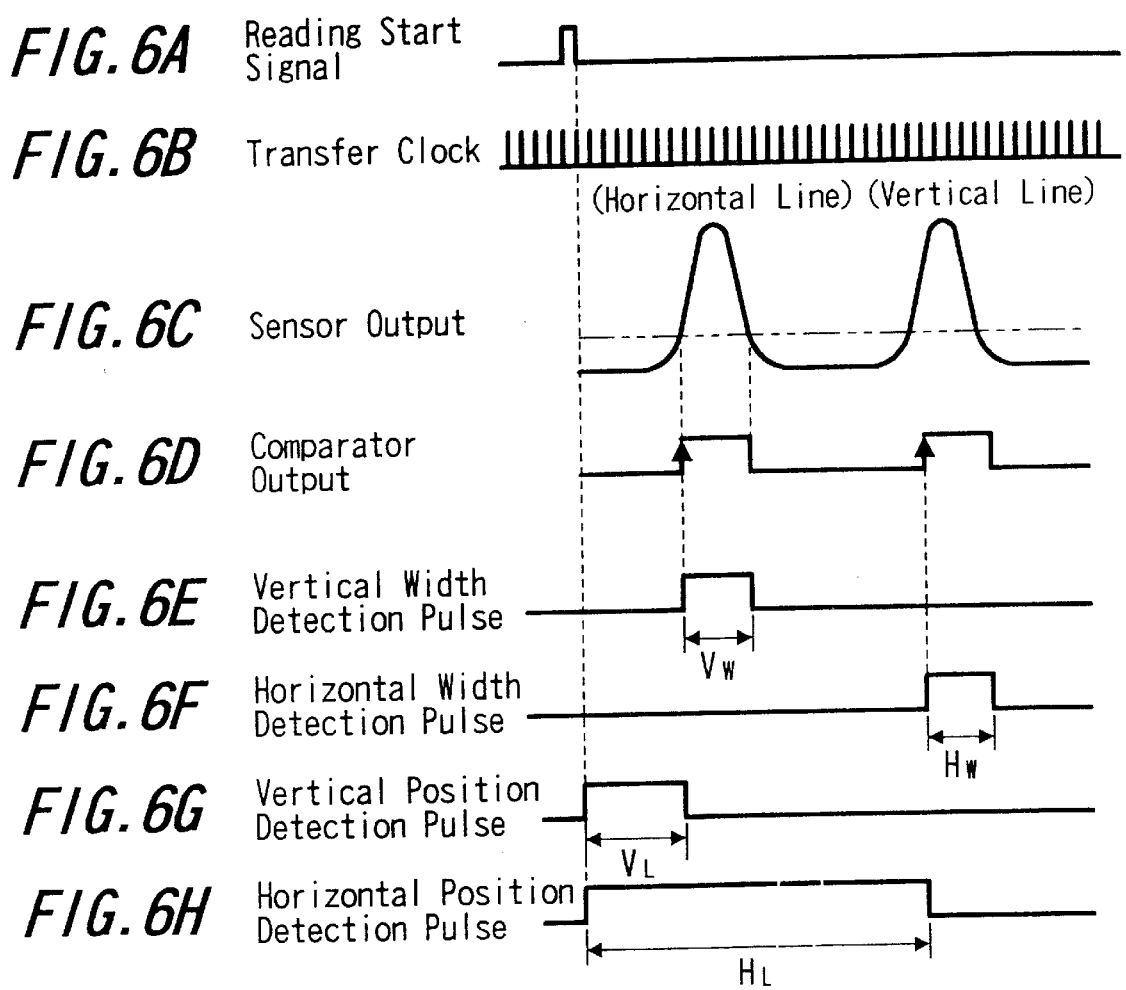
FIGS. 6A to 6H are timing charts of signals used in the arrangement shown in FIG. 5.

A signal f output from the output terminal $Q_2$ of the vertical/horizontal-line separator circuit 35 is supplied to one input terminal of an AND gate 37 as a horizontal width detection pulse (shown in FIG. 6F). This AND gate 37 is also supplied at the other input terminal with the transfer clock signal b from the terminal 32, and the transfer clock signal b is output from a terminal 52 connected to the AND gate 37 only during a pulse duration of the horizontal width detecting pulse f. A counter (not shown) connected to the terminal 52 counts the output clock signal and hence its count value corresponds to the measured horizontal-direction width Hw.

The signal e output from the output terminal $Q_1$ of the vertical/horizontal-line separator circuit 35 is also supplied to a vertical-position detector circuit 38. The vertical-position detector circuit 38 is supplied at its reset terminal R with the reading start signal a (shown in FIG. 6A) as the reset pulse and sets a signal output from an output terminal Q to a high level at a timing when the pulse supplied from the output terminal $Q_1$ of the vertical/horizontal-line separator circuit 35 to its pulse input terminal C rises after receiving the reset pulse. An invertor gate 39 is supplied with the pulse output from the output terminal Q of the vertical-position detector circuit 38 and inverts the pulse, thereby, as shown in FIG. 6G, a vertical-position detection pulse g with a duration of which ranges from the rise of the reading start signal a to the rise of the vertical-width detection pulse e being obtained. The invertor gate 39 supplies this vertical-position detection pulse g to one input terminal of an AND gate 40. This AND gate 40 is supplied at the other input terminal with the transfer clock signal b from the terminal 32 and outputs a clock signal through a terminal 53 connected to the AND gate 40 only during a pulse duration of the vertical position detecting pulse g. A counter (not shown) connected to the terminal 53 counts the output clock signal b and hence its count value corresponds to the measured vertical position $V_L$.

The signal f output from the output terminal $Q_2$ of the vertical/horizontal-line separator circuit 35 is also supplied to a horizontal-position detector circuit 41. The horizontal-position detector circuit 41 is supplied at its reset terminal R with the reading start signal a (shown in FIG. 6A) as the reset pulse and sets a signal output from an output terminal Q to a high level at a timing when the pulse supplied from the output terminal $Q_2$ of the vertical/horizontal-line separator circuit 35 to its pulse input terminal C rises after receiving the reset pulse. An invertor gate 42 is supplied with the pulse output from the output terminal Q of the horizontal-position detector circuit 41 and inverts the pulse, thereby, as shown in FIG. 6H, a horizontal-position detection pulse h with a duration of which ranges from the rise of the reading start signal a to the rise of the horizontal-width detection pulse f being obtained. The invertor gate 42 supplies this horizontal-position detection pulse to one input terminal of an AND gate 43. This AND gate 43 is supplied at the other input terminal with the transfer clock signal b from the terminal 32 and outputs a clock signal through a terminal 54 connected to the AND gate 43 only during a pulse duration of the horizontal position detecting pulse h. A counter (not shown) connected to the terminal 54 counts the output clock signal and hence its count value corresponds to the measured horizontal position $H_L$.

Measured data of the vertical-direction width $V_w$ and the horizontal-direction width $H_w$ and the vertical-direction position $V_L$ and the horizontal-direction position $H_L$ detected by the counters of the beam size measuring unit 30 as described above are transferred to the measurement control device 11. The transfer clock signal supplied from the beam measuring unit 30 to the CCD line sensor 15 is a clock signal generated based on a synchronizing signal received from the generator 12 for generating a video signal for measurement, which allows the CCD line sensor 15 to read an image in synchronization with the image displayed on the screen of the television receiver 13.

The measurement control device 11 rotates a stepping motor 19 to vary a focus state while considering the vertical-direction width Vw and the horizontal-direction width Hw as well as the vertical-direction position $V_L$ and the horizontal-direction position $H_L$. Specifically, the measurement control device 11 controls a bit inserting robot 18 to insert automatically a bit at a tip end of the stepping motor 19 into a focus adjusting volume 20 of the television receiver 13, thereby driving and controlling the focus adjusting volume 20 by the rotation of the stepping motor 19. Upon this drive and control operations, the focus adjusting volume 20 is driven, for example, over such an entire angular extent that the focus adjusting volume 20 can be rotated and respective changes of each of the data $H_W$, $V_W$, $H_L$, $V_L$ are stored in the measurement control device 11.

Figure 7:
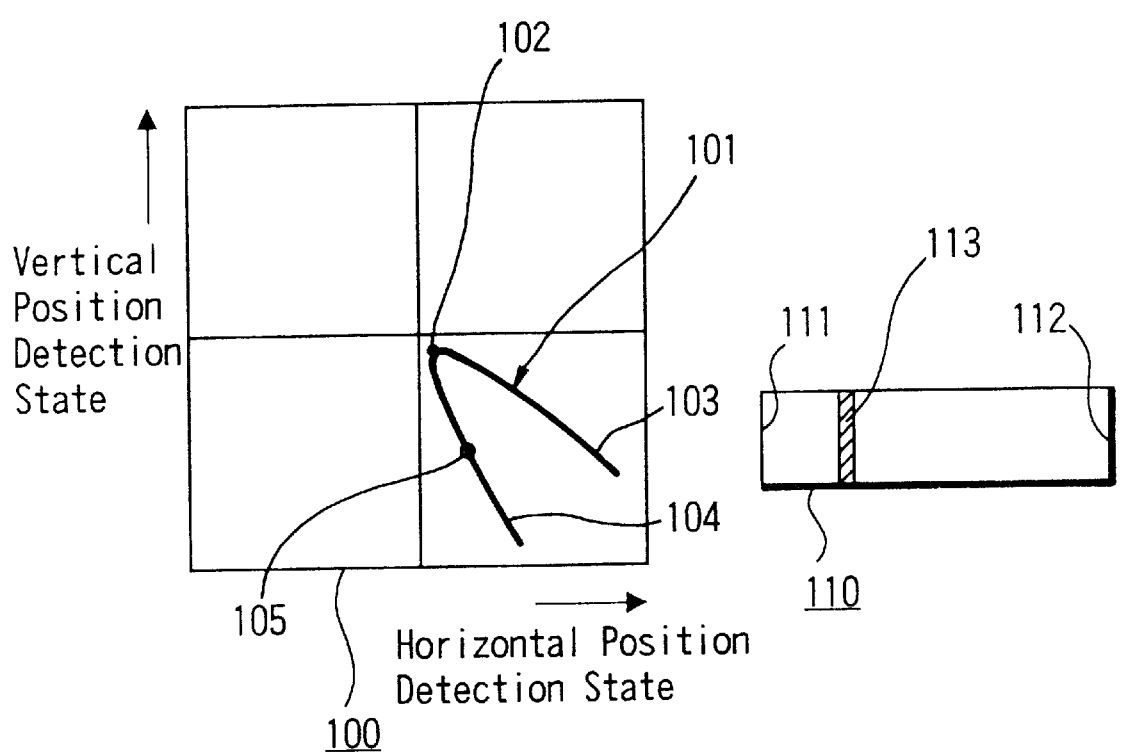
FIG. 7 is a diagram used to explain an example of a representation of a focus state according to the embodiment (an example of representation of a current position)

The measurement control device 11 displays a changed state of each of the data $H_W$, $V_W$, $H_L$, $V_L$ is displayed on a screen of a display 11a connected to the measurement control device 11. FIG. 7 shows an example of the displayed change state of the data, in which the changes of the vertical-direction position $V_L$ and the horizontal-direction position $H_L$ are displayed as a graph 100 of horizontal/vertical-direction positions and the changes of the vertical-direction width Vw and the horizontal-direction width Hw are displayed as a beam area meter 110.

In this horizontal/vertical-direction position graph 100, an ordinate represents the detected vertical-direction position and an abscissa represents the detected horizontal-direction position. Thus, the graph 100 shows the change states of the respective positions displayed on the coordinates formed by orthogonally crossing the ordinate and the abscissa. A change curve 101 shown on the horizontal/vertical-direction position graph 100 is a change curve obtained by rotating the focus adjusting volume 20. Generally, the vertical-direction position $H_L$ has the maximum value at a certain adjusted position, while the horizontal-direction position $V_L$ has the minimum value at the same adjusted position. This position is determined as a minimum point 102 and it is denoted by a mark (a solid circle in this graph). At the minimum point 102, the change curve 101 is divided into a characteristic curve 103 of the under-focus state and a characteristic curve 104 of the over-focus state. A detected position along the changing curve 101 for the current rotated position of the focus adjusting volume 20 is displayed as a current point 105 (an open circle in this graph).

The beam area meter 110 displays the detected data of the vertical- and horizontal-direction widths $H_W$ and $V_W$ as a beam area obtained by multiplying these data by the measurement control device 11. A left end of the graph 110 is denoted as a minimum point 111 and a right end thereof is denoted as a maximum point 112. A beam area corresponding to the current adjusted position of the focus adjusting volume 20 is displayed as a current point 113 in a predetermined mode between the minimum point 111 and the maximum point 112.

By displaying the focus state measured as described above, it is possible to precisely determine the changed focus state of the beam of the cathode-ray tube of the television receiver 13 which is an equipment to be adjusted. In other words, by observing the current point 105 along the change curve 101 displayed as the horizontal/vertical-direction position graph 100, it is possible to immediately determine whether the current focus state is the under-focus state or the over-focus state. Then, if the focus adjusting volume 20 is rotated from the current position and set so that the displayed current point 105 should be agreed with the minimum point 102, then the focus state is immediately set to an optimum focus state, which improves an accuracy of the focus adjustment. If it is possible to determine whether the current adjusted state is the under-focus state or the over-focus state, it can easily be carried out by a control of the measurement control device 11 to adjust automatically from the current focus state to the optimum focus state. In this embodiment, since a change of the beam area is recognized from the displayed beam area meter 110, it is possible to easily determine whether or not the current focus state is the proper focus state.

Figure 8:
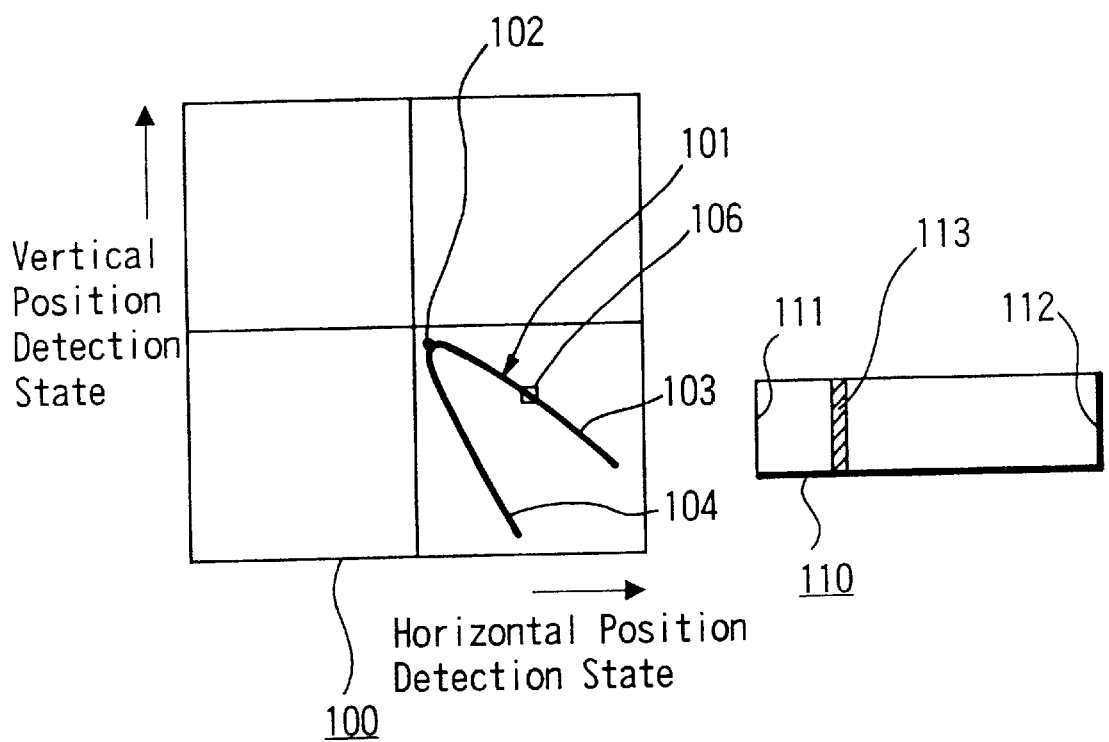
FIG. 8 is a diagram used to explain another example of the representation of the focus state according to the embodiment (an example of representation of an initial position).

While in the display example shown in FIG. 7 the current point 105 is displayed along the changing curve 101 for the horizontal/vertical-direction position graph 100, the present invention is not limited thereto. For example, as shown in FIG. 8, a value obtained before the rotation of the focus adjusting volume 20 (i.e. an initial value when the adjusting operation is started) may be displayed along the changing curve 101 by a predetermined mark 106 (an open square in this graph). This arrangement allows a focus state prior to the focus measurement to be determined, which allows an estimation of the focus state before the adjustment. Moreover, it is possible to return a focus state of the television receiver 13 to the one prior to the focus measurement.

The current point 105 shown in FIG. 7 and the initial position 106 shown in FIG. 8 may simultaneously be displayed on the same graph. The beam area meter 110 may be displayed which showing the varying state of the beam in the form of a graph. Further, the beam area meter 110 need not be displayed.

While in this embodiment the graph showing the focus state is the graph displaying the vertical-direction position $H_L$ and the horizontal-direction position $V_L$ on the orthogonal coordinates, a graph displaying the vertical-direction width $V_w$ and the horizontal-direction width $H_w$ on the orthogonal coordinates may be used. Even when the graph showing the changes of the vertical-direction width $V_w$ and the horizontal-direction width $H_w$ is used, the graph displaying the focus state from the under-focus state through the minimum point to the over-focus state can also be obtained, which enables the focus state to be accurately estimated.

While in this embodiment the crosshatch image including the vertical and horizontal lines crossing each other is read by the single CCD line sensor, the image of other shape may be displayed. Alternately, separate sensors for reading an image in the horizontal and the vertical directions may be employed.

While in this embodiment one measurement is carried out based on the image displayed at the predetermined position on the screen of the cathode ray tube, an image for measurement (in this embodiment, the crosshatch image) may be displayed at a plurality of positions on the screen to measure the focus state at the plural positions, thereby a total focus state of an entire picture screen being adjusted so as to be a proper focus state.

While in this embodiment the adjustment is performed by rotating the focus adjusting volume 20 of the television receiver 13, if the television receiver to be adjusted has a memory for storing focus control values and the focus control is performed on the basis of the control data stored in this memory, then it is necessary only to rewrite the control data in this memory based on measured data, thereby the adjustment arrangement being simplified.

While in this embodiment the focus of the cathode-ray tube of the television receiver is measured, it is needless to say that the present invention is not limited thereto and can be applied to the focus measurement of other image display apparatus (such as a display for a computer) having the cathode ray tube.

According to the present invention, since the change of the image resulting from the change of the focussing voltage is displayed and the change from the over-focus state through the in focus state to the under-focus state can be confirmed based on the display, the most proper focus state, the current focus state and so on can be measured and thus the simple and accurate focus adjustment can be realized.

In this case, the image including at least the vertical line and the horizontal line is displayed and the line sensor is located so as to cross the both of the lines. Thus, the changes of the distances from the reference position to the edges of the lines in the respective directions in the image read by the line sensor are detected and the detected changes of the respective distances are displayed on the orthogonal coordinates. Therefore, the change state from the over-focus state to the under-focus state is satisfactorily displayed, which can simplify the operation of setting the focus state to an optional one.

Since, when the detected change of the distances is displayed on the orthogonal coordinates, the position allowing the respective distances to be the shortest in the representation of the changes of the distances is displayed thereon, the in focus position is displayed on the representation indicative of the change of the focus state, which can simplify the adjustment of the focus state to the in focus state.

Moreover, since, when the just-focus position is displayed on the screen, the current focus position is also displayed, it is easily determined to what extent the adjustment should be made in order to obtain the in focus state, thereby allowing the adjustment of the focus state to the in focus state to be easily achieved.

Moreover, since the position corresponding to the focussing voltage before the voltage is changed is displayed in the representation of the changes of the distances, the focus state prior to the adjustment can be recognized and it is possible to return the focus state to the focus state before the adjustment and also to compare it with the focus state after the adjustment.

Moreover, since the detected data of the width of the vertical line based on the output from the line sensor and the detected data of the width of the horizontal line based on the output from the line sensor are multiplied and then the change of the multiplied value is also displayed by the display means, the focus state can also be recognized from the change of the line widths, which enables the more precise adjustment.

Moreover, since the distances from the one edges to the other edges of the respective lines in the image are employed as the distance from the reference position to the predetermined position in the image, the change of the focus state from the over-focus state to the under-focus state similar to the above-mentioned case is also satisfactorily displayed even based on the detected data of the widths of the lines simultaneously. Therefore, it is possible to easily adjust the focus state to the optional focus state.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A method of measuring a focus of a cathode ray tube by using an image displayed on a screen of the cathode ray tube, comprising the steps of:

employing a predetermined image having a representation of a vertical-direction line and a horizontal-direction line;

displaying the predetermined image at a predetermined position on the screen;

changing a focussing voltage of said cathode ray tube while detecting a distance from a reference position to a predetermined position in the image;

locating a line sensor crossing both of said vertical-direction line and said horizontal-direction line in order to define a predetermined position of said line sensor as said reference position;

detecting a change of a first distance from said reference position to an edge of said vertical-direction line on an image read by said line sensor and a change of a second distance from said reference position to an edge of said horizontal-direction line on said image read by said line sensor; and displaying the detected changes of the respective distances on orthogonal coordinates on a display.

2. The method of measuring a focus of a cathode ray tube according to claim 1, wherein a position corresponding to the shortest one of said first and second distances is displayed on said display.

3. The method of measuring a focus of a cathode ray tube according to claim 2, wherein a position corresponding to said first and second distances detected when a present focussing voltage is used is displayed on said display.

4. The method of measuring a focus of a cathode ray tube according to claim 1, wherein a position corresponding to said first and second distances detected before a focussing voltage is changed is displayed on said display.

5. The method of measuring a focus of a cathode ray tube according to claim 1, wherein detected data corresponding to a width of said vertical-direction line output from said line sensor is multiplied by detected data corresponding to a width of said horizontal-direction line output from said line sensor, and wherein a change of the multiplied value is displayed on said display.

6. The method of measuring a focus of a cathode ray tube according to claim 1, wherein a distance from one edge of said vertical-direction line to the other edge within said image is employed as said first distance from said reference position to said predetermined position within said image, and a distance from one edge of said horizontal-direction line to the other edge within said image is employed as said second distance from said reference position to said predetermined position within said image.

* * * * *